United States Patent Office 2,968,643
Patented Jan. 17, 1961

1

2,968,643

SULFO-ARALKYLSILOXANES AND SALTS THEREOF

Donald L. Bailey, Snyder, N.Y., assignor to Union Carbide Corporation, a corporation of New York No Drawing. Filed Dec. 31, 1958, Ser. No. 784,035
17 Claims. (Cl. 260—46.5)

This invention relates to organo-functional organosilicon compounds and to a process for their production. More particularly, this invention relates to organosilicon compounds containing a sulfo radical and the salts thereof interconnected to silicon through an aralkyl group and to a process for their production.

Silicon compounds containing a sulfo radical interconnected to silicon through a phenyl group cannot be prepared by sulfonation of phenylsilicon compounds, since the phenylsilicon bond is cleaved under the reaction conditions of the sulfonation or chlorosulfonation. Silicon compounds containing a benzyl group attached to the silicon atom have been sulfonated and chlorosulfonated; however, these benzylsilicon compounds were either non-functional with respect to silicon, (i.e., silanes having no reactive silicon valences) or monofunctional with respect to silicon, (i.e., silanes and siloxanes having only one reactive silicon valence). Furthermore, such sulfonated benzyl-silicon compounds are not stable in alkaline solutions. When they are placed in alkaline solution, the benzyl-silicon bond is ruptured.

I have discovered that sulfo-aralkylsilicon compounds wherein the aryl group is interconnected to silicon through from 2 to 4 aliphatic carbon atoms are completely stable toward cleavage of the aralkyl-silicon bond even under highly acidic or basic conditions. These sulfo-aralkylsilicon compounds are water soluble and behave as strong acids in solutions. The sulfo-aralkylsilicon compounds of this invention are useful as catalysts for the polymerization of isobutylene. The sulfo-aralkylsilicon compounds of this invention can be converted to salts by treatment with a base such as sodium hydroxide, potassium hydroxide, ammonium hydroxide and the like, such salts are useful as anti-fog agents for glass surfaces.

The novel organo-functional organosilicon compounds of this invention are organosiloxanes containing at least one unit of the formula:

$$MO_3S-\overset{\overset{\textstyle Z}{|}}{R}-C_aH_{2a}\overset{\overset{\textstyle R'_n}{|}}{Si}O_{\frac{3-n}{2}} \qquad (1)$$

wherein Z is a hydrogen atom, an alkyl group, an aryl group or a group having the formula:

$$-C_aH_{2a}\overset{\overset{\textstyle R'_n}{|}}{Si}O_{\frac{3-n}{2}}$$

or

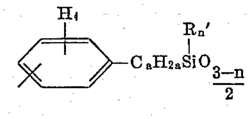

or

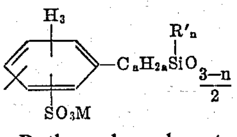

interconnected to R through carbon to carbon linkage, R is a trivalent aryl group containing up to and including 10 carbon atoms, R′ is an alkyl group, ($a$) is an

2 integer of from 2 to 4 where the aryl group is interconnected to silicon through at least 2 carbon atoms, ($n$) is an integer of from 0 through 2, and M is a member of the class consisting of hydrogen, alkali metal groups and the ammonium group. These organo-functional organosilicon compounds wherein M is hydrogen are hereinafter referred to as sulfo-aralkylsilicon compounds. Where M is an alkali metal or an ammonium group, the compounds are hereinafter referred to as the salts of the salts of the sulfo-aralkylsilicon compounds. By the term "sulfo," as employed herein, is meant a group having the formula $HO_3S—$. By the term "chlorosulfonyl," as employed herein, is meant a group having the formula $—SO_2Cl$.

The alkaline earth metal salts of the sulfo-aralkylsilicon compounds depicted by Formula 1 wherein M is hydrogen can also be prepared and are considered as part of the instant invention. These alkaline earth metal salts are prepared by reacting stoichiometric amounts of an alkaline earth metal hydroxide or oxide and the sulfo-aralkylsilicon compound in a water solution. The water solution is then evaporated to dryness to yield the alkaline earth metal salt of said sulfo-aralylsilicon compound. Stoichiometric amounts of the alkaline earth metal hydroxide and sulfo-aralkylsilicon compound are calculated on the basis that each molecule of an alkaline earth metal oxide or hydroxide reacts with two sulfo groups of the sulfo-aralkylsilicon compound.

Included in the organosiloxanes of this invention are the sulfo-aralkylsiloxanes and salts of said sulfo-aralkylsiloxanes composed of repeating units of the structure depicted by Formula 1. Thus, for example, the sulfo-aralkylsiloxanes of this invention are; trifunctional with respect to silicon (i.e., as described by Formula 1 where $n=0$); difunctional with respect to silicon (i.e., as described by Formula 1 where $n=1$); monofunctional with respect to silicon (i.e., as described by Formula 1 where $n=2$); and also include the sulfo-aralkylsiloxane composed of any combination of mono-, di-, and/or trifunctional units of Formula 1. Illustrative of such trifunctional sulfo-aralkylsiloxane are, beta-(sulfophenyl)ethylpolysiloxane $HO_3S—C_6H_4(CH_2)_2SiO_{3/2}$, beta-(sulfonaphthyl)ethylpolysiloxane $HO_3S—C_{10}H_6(CH_2)_2SiO_{3/2}$, gamma-(sulfophenyl)propylpolysiloxane $$HO_3S—C_6H_4(CH_2)_3SiO_{3/2},$$

beta-(sulfophenyl)propylpolysiloxane $$HO_3SC_6H_4—CH(CH_3)CH_2SiO_{3/2}$$

and the like and their salts. The difunctional sulfo-aralkylsiloxanes and salts of said sulfo-aralkylsiloxanes of this invention contain units of the formula:

$$MO_3S-\overset{\overset{\textstyle Z'}{|}}{R}-(C_aH_{2a})\overset{\overset{\textstyle R'}{|}}{Si}-O$$

where R, R′, M and ($a$) have the above-defined meanings and Z′ is a member of the class consisting of hydrogen, alkyl, aryl and groups having the structure:

$$C_aH_{2a}-\overset{\overset{\textstyle R'}{|}}{Si}O$$

or

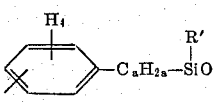

or

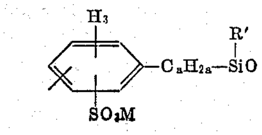

interconnected to R through carbon to carbon linkage, where R', M and (*a*) have the above-defined meaning. These difunctional sulfo-aralkylsiloxanes include the cyclic sulfo-aralkylsiloxanes having from 3 to 7 such units and they also include the linear sulfo-aralkylsiloxanes having a number of such units. Illustrative of such linear sulfo-aralkylsiloxanes are, for example, beta-(sulfo-phenyl)ethyl(methyl)polysiloxane $$[HO_3S—C_6H_4C_2H_4Si(CH_3)O]$$

beta-(sulfonaphthyl)ethyl(propyl)polysiloxane $$[HO_3S—C_{10}H_6C_2H_4Si(C_3H_7)O]$$

gamma-(sulfophenyl)propylmethylpolysiloxane $$[HO_3S—C_6H_4C_3H_6Si(CH_3)O]$$

and the like. Illustrative of such cyclic sulfo-aralkylsiloxanes are, tetra-[beta-(sulfophenyl)ethyl]tetramethylcyclo-tetrasiloxanes, $[(HO_3S—C_6H_4—C_2H_4)Si(CH_3)O]_4$, tri-[gamma-(sulfophenyl)propyl]trimethylcyclotrisiloxane $[HO_3S—C_6H_4—C_3H_6—Si(CH_3)O]_3$ and the like.

Also included as the organosiloxanes of this invention are sulfo-aralkylsiloxanes and their salts containing at least one unit of the Formula 1 with one or more siloxane units of the formula:

$$R''_bSiO_{\frac{4-b}{2}} \qquad (2)$$

wherein R'' is a monovalent hydrocarbon radical, (*b*) is an integer of from 0 through 3, R'' need not be the same throughout the molecule and (*b*) need not be the same throughout the molecule, but is the same in the same unit. These sulfo-aralkylsiloxanes contain at least one mono-, di- and/or trifunctional unit of Formula 1 with at least one mono-, di-, tri- and/or tetra-functional unit of Formula 2.

Illustrative of the trivalent aryl groups as represented by R, are for example, the trivalent aryl groups derived from benzene and naphthylene and the like. Illustrative of the alkyl groups are represented by R', are for example, methyl, ethyl, propyl, stearyl and the like. It is preferred that such alkyl groups contain from 1 to 18 carbon atoms since no commensurate advantage is obtained where the alkyl group contains more than 18 carbon atoms. Illustrative of the groups as represented by Z are the alkyl groups as given for R'; aryl groups, for example, phenyl, tolyl, xylyl, naphthyl and the like; and groups such as $(—C_2H_4SiO_{3/2})$, $(—C_6H_4C_3H_6—SiO_{3/2})$, $(—C_4H_8C_2H_5SiO)$,

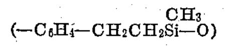

and the like. Illustrative of the monovalent hydrocarbon radicals as represented by R'' include the alkyl groups as described for R'; the aryl groups as described for Z; alkenyl groups such as vinyl, allyl, butenyl and the like; aralkyl groups such as phenylethyl, phenylpropyl and the like; cycloaliphatic groups such as cyclopentyl, cyclohexenyl and the like. The sulfo-aralkylsiloxanes of this invention are produced by several different processes. Among these processes are the following:

*Process I.*—Hydrolysis of the corresponding chlorosulfonyl-aralkylsiloxanes.

*Process II.*—Sulfonation of an aralkylsilicon compound with a sulfonating agent such as fuming sulfuric acid or sulfur trioxide.

According to the procedure of Process I, the sulfo-aralkylsiloxanes of this invention are produced by the hydrolysis of a chlorosulfonyl-aralkylsilicon compound by water. The chlorosulfonyl-aralkylsilicon compound employed in Process I are described below and include the chlorosulfonyl-aralkylhalosilanes and chlorosulfonyl-aralkylsiloxanes. The hydrolysis of the chlorosulfonyl-aralkylhalosilane to produce the sulfo-aralkylsiloxanes of this invention can be conducted as a stepwise process wherein the chlorosulfonyl-aralkylsiloxane is first formed and then further hydrolyzed to the sulfo-aralkylsiloxane. The hydrolysis process can also be conducted as a one step method going directly from a chlorosulfonyl-aralkylhalosilane or a chlorosulfonyl-aralkylsiloxane to the sulfo-aralkylsiloxane. It has been found that by maintaining a mixture of a chlorosulfonyl-aralkylhalosilane and water at a temperature in the range from about 0° C. to about 50° C. results in the selective hydrolysis and condensation of silicon-bonded halogen atom to form a chlorosulfonyl-aralkylsiloxane. The chlorosulfonyl-aralkylsiloxane is then hydrolyzed by heating said chlorosulfonyl-aralkylsiloxane with water to a temperature in the range from about 80 to 100° C. In the one step method, a chlorosulfonyl-aralkylhalosilane or a chlorosulfonyl-aralkylsiloxane is hydrolyzed by heating with water to a temperature in the range from about 80° C. to about 100° C. The following equations illustrate the hydrolysis (A) by the two step method and (B) by the one step method employing beta-(chlorosulfonylphenyl)-ethyltrichlorosilane as the chlorosulfonyl-aralkylhalosilane starting material:

A.

$$ClSO_2—C_6H_4CH_2CH_2SiCl_3+1.5\,H_2O \xrightarrow{0°\text{ C. to }50°\text{ C.}}$$

$$ClSO_2—C_6H_4CH_2CH_2SiO_{3/2}+3HCl\;H_2O \xrightarrow{80°\text{ C. to }100°\text{ C.}} HOSO_2—C_6H_4CH_2CH_2—SiO_{3/2}+HCl$$

B.

$$ClSO_2C_6H_4CH_2CH_2SiCl_3+2.5\,H_2O \xrightarrow{80°\text{ C. to }100°\text{ C.}} HOSO_2—C_6H_4CH_2CH_2SiO_{3/2}+4HCl$$

or $$ClSO_2C_6H_4CH_2CH_2SiO_{3/2}+H_2O \xrightarrow{80°\text{ C. to }100°\text{ C.}} HOSO_2C_6H_4CH_2CH_2—SiO_{3/2}+HCl$$

A solvent is not necessary in the hydrolysis of the chlorosulfonyl-aralkylsiloxane to the sulfo-aralkylsiloxanes; however, a solvent can be used if desired. Suitable solvents for the hydrolysis are the water soluble solvents such as, for example, ethanol, dioxane, the dimethyl ethers of ethylene glycol and the like. The hydrolysis reaction is advantageously conducted with an excess of water present (i.e., about 5 to 10 times the amount of water required for the hydrolysis of the chlorosulfonyl groups and any silicon-bonded halogen atoms to be hydrolyzed and since the sulfo-aralkylsiloxanes are water soluble, a homogeneous aqueous solution of the sulfo-aralkylsiloxane results.

The chlorosulfonyl-aralkylsilicon compounds that are useful as starting material for the preparation of the sulfo-aralkylsiloxanes of this invention by the hydrolysis process (Process I) are the chlorosulfonyl-aralkylsilicon compounds selected from the class consisting of chlorosulfonyl-aralkylhalosilanes of the formula:

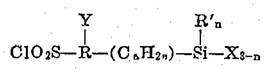

(3)

wherein R, R', (*a*) and (*n*) have the above-defined meanings, X is halogen preferably fluorine, chlorine or bromine, and Y is a member of the class consisting of hydrogen, alkyl groups, aryl groups, and groups of the formula:

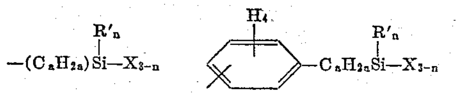

and

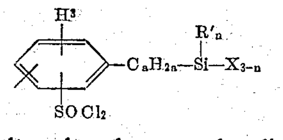

connected to R through carbon to carbon linkage, wherein R′, X, (*a*) and (*n*) have the above-defined meanings, and chlorosulfonyl-aralkylsiloxanes containing at least one unit of the formula:

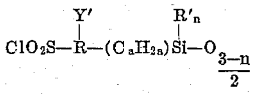
(4)

wherein R, R′, (*a*) and (*n*) have the above-defined meanings and Y′ is a member of the class consisting of hydrogen, alkyl groups, aryl groups and groups of the formula:

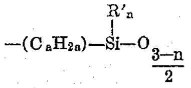

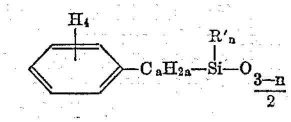

and

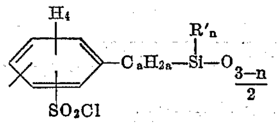

connected to R through carbon to carbon linkage, R, R′, (*a*) and (*n*) having the above-defined meanings. These chlorosulfonyl-aralkylsiloxanes can be prepared by the hydrolysis and condensation of the corresponding chlorosulfonyl-aralkylhalosilanes as shown by the first reaction of Equation A.

The chlorosulfonyl-aralkylhalosilanes are prepared by the reaction of chlorosulfonic acid with an aralkylhalosilane of the formula:

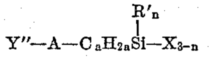
(5)

wherein R′, X, (*a*) and (*n*) have the above-defined meanings, A is a divalent aryl group containing up to and including 10 carbon atoms and Y″ is a member of the class consisting of hydrogen, alkyl groups, aryl groups and groups of the formula:

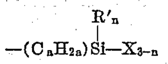

and

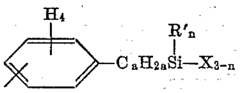

wherein R′, X, (*a*) and (*n*) have the above-defined meanings, in the presence of chloroform.

Included in the chlorosulfonyl-aralkylsiloxanes starting materials are the chlorosulfonyl-aralkylsiloxanes composed entirely of units of Formula 4. Such chlorosulfonyl-aralkylsiloxanes include those containing units that are only monofunctional with respect to silicon, only difunctional with respect to silicon, or only trifunctional with respect to silicon or the chlorosulfonyl-aralkylsiloxanes are composed of such units wherein the functionality of the silicon atom is mono-, di-, and/or trifunctional.

Also included as the chlorosulfonyl-aralkylsiloxanes starting material are those chlorosulfonyl-aralkylsiloxanes composed of at least one unit of Formula 4 with one or more siloxane units of Formula 2.

The sulfo-aralkylsiloxanes of this invention are also produced according to the procedure of Process II as mentioned above which is as follows:

A sulfonating agent is charged into a reaction vessel and an aralkylsilicon compound is added slowly with stirring while maintaining the reaction mixture at a temperature at which said sulfonating agent and said aralkylsilicon compound react to produce said sulfoaralkylsilicon compound. Water is then added and the sulfoaralkylsilicon compound is isolated from the water solution thus formed.

The sulfonating agents which are useful in Process II of this invention are, for example, fuming sulfuric acid, sulfur trioxide and the like.

The temperature at which Process II is conducted, is not narrowly critical and can range from as low as −100° C. to as high as +100° C. However, when fuming sulfuric acid is used as the sulfonating agent, temperatures in the range of 50° C. to 70° C. are preferred. Below 50° C. the reaction is slow and an excess of the aralkylsilicon compound accumulates, thus favoring the formation of sulfones and a reduction in the yield of the sulfo-aralkylsiloxanes. Temperatures above about 70° C. also favor the formation of sulfones, thus reducing the yield of the desired sulfo-aralkylsiloxanes.

It is believed that Process II takes place according to the following equations in which beta-phenylethyltrichlorosilane and beta-phenylethylsiloxane are used for the purpose of illustration in Equations C and D, respectively.

C.

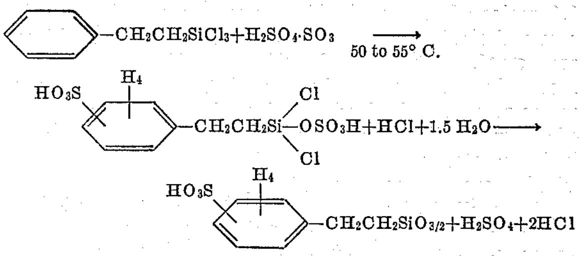

D.

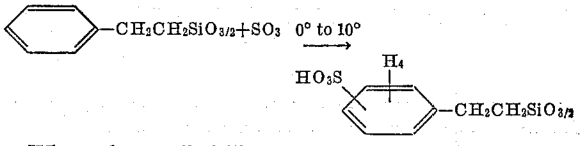

When the aralkylsilicon compound employed as a starting material for the sulfonation is an aralkylhalosilane, a solvent is not necessary when the sulfonating agent is fuming sulfuric acid; however, a solvent can be used if desired. When the aralkylsilicon compound to be sulfonated is an aralkylsiloxane, the sulfonation of said aralkylsiloxane employing fuming sulfuric acid requires a solvent to allow for more intimate contact of the reagents. The only criteria for such solvents is that the solvent be substantially non-reactive under the reaction conditions. Highly chlorinated aliphatic hydrocarbon solvents such as chloroform, carbon tetrachloride, perchloroethylene and the like are particularly useful. The amount of solvent used is not narrowly critical and can be from 10% to 90% by weight of the total mixture, i.e., solvent sulfonating agent and aralkylsilicon compounds. It is preferred to employ solvents in amounts of from about 30% to 60% by weight of the total mixture.

The reaction of aralkylhalosilanes with fuming sulfuric acid in the absence of a solvent is substantially complete in 30 min. to 1 hr. A longer reaction time is necessary for sulfonating the aralkylsiloxanes. Several hours of heating and stirring at 45–50° C. are required before the aralkylsiloxanes are completely sulfonated with fuming sulfuric acid. When liquid sulfur trioxide, chemically a very active sulfonating agent for aromatic compounds, is used as the sulfonating agent, it reacts violently with aralkylsilicon compounds even at 0° C. For this reason, solvents are required when liquid sulfur trioxide is employed as the sulfonating agent. Gaseous sulfur trioxide can also be used in place of the liquid sulfur trioxide. Highly halogenated aliphatic hydrocarbon solvents, such as, carbon tetrachloride, tetrachloroethylene and the like and also sulfur dioxide are suitable solvents, although other inert solvents can be employed. Sulfur dioxide is preferred as a solvent since it is low boiling and substantially inert to sulfur trioxide under the reaction conditions.

The temperature at which the sulfonation takes place when sulfur trioxide is employed as the sulfonating agent is not narrowly critical and can range from −100 to +100° C. It is preferred to conduct the reaction at temperatures of from 0 to 10° C. to avoid undesirable side reactions which reduce the yield of product.

The ratio of fuming sulfuric acid to the aralkyl silicon that will give the highest yields of the sulfoaralkyl silicon compounds is three equivalents of fuming sulfuric acid to one equivalent of aralkyl group of the aralkylsilicon compound desired to be sulfonated. Of course higher and lower ratios of fuming sulfuric acid to aralkylsilicon can be employed but no commensurate advantage is obtained thereby. Lower ratios give lower yields whereas higher ratios require the removal of greater amounts of sulfuric acid from the product.

The amount of the sulfur trioxide employed is not narrowly critical. However, I prefer to employ about 1.1 moles of sulfur trioxide for each mole of the sulfo group desired to be introduced into the aralkylsilicon compound. Amounts of sulfur trioxide greater than those given above can be used but no commensurate advantages are obtained thereby. The chief advantage of sulfur trioxide over sulfuric acid as a sulfonating agent is its greater reactivity; thus, large excesses of sulfur trioxide are unnecessary.

The aralkylsilicon compound employed as starting materials in the preparation of the sulfo-aralkylsiloxanes of this invention according to the procedure of Process II are the aralkylsilicon compounds selected from the class consisting of aralkylsilanes of the Formula 5 i.e.

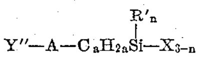

where R′, A, X, Y″, (*a*) and (*n*) have the above-defined meanings and aralkylsiloxanes of the formula:

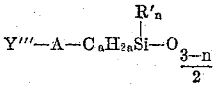

wherein R′, A, (*a*) and (*n*) have the above-defined meanings and Y‴ is a member of the class consisting of hydrogen, alkyl groups and groups of the formula

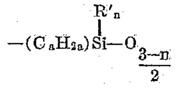

and

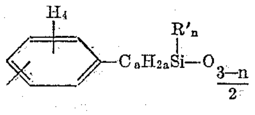

inter-connected to A through carbon to carbon linkage where R′, (*a*) and (*n*) have the above-defined meanings.

Illustrative of the divalent aryl groups as represented by A are, for example, the divalent aryl groups derived from benzene, naphthylene and the like. Illustrative of the alkyl and aryl groups as represented by Y, Y′, Y″ and Y‴ are the alkyl and aryl groups given for Z.

In order to increase the silicon content of the sulfo-aralkylsiloxanes produced by the procedure described above said sulfo-aralkylsiloxanes can be equilibrated with siloxanes of Formula 2 by employing an acidic equilibration catalyst to yield sulfo-aralkylsiloxane containing one or more units of the structure as depicted by Formula 1 and one or more units of the structure as depicted by Formula 2. Thus, for example, beta-(sulfophenyl) ethylmethylsiloxane, dimethylsiloxane and hexamethyldisiloxane can be mixed and about 1% concentrated sulfuric acid added with stirring and the resultant mixture allowed to stand for about 24 hours. A trimethyl end-blocked siloxane oil containing dimethylsiloxane units and beta-(sulfophenyl)ethylmethyl siloxane units is thus produced.

Process I is the preferred method to be employed in producing the sulfo-aralkylsiloxanes of this invention. The method of Process I is preferred since the chlorosulfonylaralkylhalosilanes are volatile compounds and can be purified by distillation prior to their use in the process. This distillation eliminates the necessity of the purification steps described below to remove the sulfuric acid impurity.

The sulfo-aralkylsiloxanes of this invention can be converted to the corresponding salts by treatment with a base such as sodium hydroxide, potassium hydroxide, ammonium hydroxide and the like, or by treatment with ammonia and the like. Such salts are produced according to the following equation (E)

$$NaOH+HO_3S\text{–}C_6H_4CH_2CH_2SiO_{3/2}\rightarrow NaO_3S\text{–}C_6H_4SiO_{3/2}+H_2O$$

which depicts the reaction between sodium hydroxide and betasulfophenyl-ethylsiloxane for the purposes of illustration. Stoichiometric ratios of the base and the sulfoaralkylsilicon compound are preferred if good yields are to be obtained. These salts are useful as anti-fog agents for glass surfaces.

In the production of the sulfoaralkylsiloxanes of this invention by the processes described above sulfuric acid and/or hydrochloric acids are sometimes present as impurities. The sulfuric acid and hydrochloric acid impurities can be separated from the sulfoaralkylsiloxane by the addition of water to form an aqueous solution. Removal of the hydrochloric acid impurity from the product is advantageously accomplished by distilling it from the non-volatile sulfoaralkylsiloxanes along with the water added. Removal of the sulfuric acid impurity is advantageously accomplished by any one of the following methods.

(1) Addition of glacial acetic acid: A large excess of glacial acetic acid is added to an aqueous solution of the sulfoaralkylsiloxane (50–90 weight percent sulfoaralkylsiloxane) to precipitate the sulfoaralkylsiloxane. The precipitated sulfoaralkylsiloxane is washed with acetic acid until free of sulfuric acid. Evaporation of residual acetic acid under reduced pressure gives the purified sulfoaralkylsiloxane.

(2) Precipitation of sulfuric acid as barium sulfate with barium hydroxide: The sulfuric acid impurity can be precipitated from an aqueous solution of the sulfoaralkylsiloxane as barium sulfate by the addition of barium hydroxide, the solution filtered and the filtrate evaporated to dryness to yield the sulfoaralkylsiloxane.

(3) Purification through the ammonium salt: An aqueous solution of the sulfoaralkylsiloxane containing sulfuric acid as an impurity is neutralized with ammonium hydroxide to yield an aqueous solution of the ammonium salt of the sulfoaralkylsiloxane. The aqueous solution of said ammonium salt is then evaporated to dryness and dried at about 150° C. The dried ammonium salt is then extracted with anhydrous methanol. Ammonium sulfate is insoluble in anhydrous methanol and is not extracted. The methanol is then removed by evaporation and the ammonium salt is dissolved in water to form an aqueous solution of the ammonium salt of the sulfoaralkylsiloxane. The aqueous solutions of the ammonium salt of the sulfo-aralkylsiloxane is then converted to an aqueous solution of the sulfo-aralkylsiloxane by passing an aqueous solution of the salt through a cation exchange resin. Purified sulfo-aralkylsiloxane is recovered by the evaporation of the water from the aqueous solution of said sulfo-aralkylsiloxane.

The following examples serve to further illustrate this invention and are not to be construed as limitations thereon.

EXAMPLE I

Beta-chlorosulfonylphenylethyltrichlorosilane was prepared by reacting 240 g. (1.0 mole) of beta-phenylethyltrichlorosilane with 351 g. (3.0 moles) of chloro-sulfonic acid in 1000 g. of chloroform at 4–7° C. over a 1½ hr. period. The reaction mixture was allowed to stand overnight during which time two layers formed, a lower layer consisting essentially of sulfuric acid and an upper layer consisting essentially of beta-(chlorosulfonylphenyl)ethyl trichlorosilane. The sulfuric acid layer removed, and the chloroform solution containing the beta-(chlorosulfonylphenyl)ethyltrichlorosilane treated with anhydrous calcium chloride. The calcium chloride treated chloroform solution was filtered and the chloroform removed under reduced presure to yield 302 g. of beta(chlorosulfonylphenyl)ethyl trichlorosilane.

The beta-(chlorsulfonylphenyl)ethyltrichlorosilane was added from a dropping funnel to 500 g. of crushed ice in a two liter beaker. The addition required 1.0 hr. and the ice mixture was stirred continuously. The intermediate beta-chlorosulfonylphenylethylsiloxane was formed as a white water-insoluble granular solid material. The solid material was broken up with a spatula and the resultant suspension was placed on a steam bath at greater than 80° C. for 90 hrs. to hydrolyze the chlorosulfonyl groups and give the completely water soluble beta(sulfophenyl)ethylsiloxane. The water solution was filtered and stripped to dryness at reduced pressure to give a residue. The residue was dried for 50 hrs. at 60–80° C. The residue amounted to an 85 mole-percent yield of solid resinous beta(sulfophenyl)-ethylsiloxane which was contaminated with 0.95 meq. of sulfuric acid per gram of beta(sulfophenyl)ethylsiloxane. This contamination with sulfuric acid can be avoided by adding a distilled sample of beta-chlorosulfonyl(phenyl)ethyltrichlorosilane to the crushed ice. A 91-g. sample of the solid resinous beta(sulfophenyl)ethylsiloxane was dissolved in 400 ml. of distilled water and passed through a glass column (2 cm. diameter × 12 cm. long) packed with 40 g. of freshly washed Rohm and Haas Amberlite IR–410 (OH) base-exchange resin. The effluent was stripped to dryness and dried for 26.5 hrs. at 90° C. at reduced pressure to give 82.7 g. of sulfuric acid-free beta(sulfophenyl)ethylsiloxane. Elemental analysis of the product gave the following results:

Calculated for $C_8H_9O_{4.5}Si$ S: Si, 11.9%; S, 13.5%; C, 40.6%; neut. equiv. 237.3. Found Si, 11.4%; S, 13.1%; C, 40.4%; neut. equiv. 241.

EXAMPLE II

In a 50-ml. flask equipped with a thermometer, magnetic stirrer, and dropping funnel was placed 3.2 g. (0.03 mole) of fuming sulfuric acid (30% $SO_3$). To the reaction vessel was added 2.0 g. (0.008 mole) of beta-phenylethyltrichlorosilane over a 5-min. period. The temperature was kept at 50° C. by means of a water bath. The reaction mixture was hydrolyzed on 5 g. of crushed ice followed by complete neutralization with concentrated ammonium hydroxide to form the ammonium salts of the beta-(sulfophenyl)ethylsiloxane, ammonium sulfate and ammonium chloride. After stripping to dryness, the solid residue obtained was extracted with 10 ml. of anhydrous methanol to dissolve the ammonium salt of beta-sulfophenylethylsiloxane. The remaining residue of ammonium sulfate and chloride was discarded. Evaporation of the methanol solution gave 1.8 g. (91 mole-percent yield) of beta(ammoniumsulfophenyl)ethylsiloxane $$(NH_4O_3S\text{–}C_6H_4\text{–}CH_2CH_2SiO_{3/2})$$

EXAMPLE III

In a 250-ml. 3-necked flask equipped with a mechanical stirrer, dropping funnel, and thermometer was placed 15 g. (0.15 mole) of fuming sulfuric acid (30% $SO_3$). To the sulfuric acid was added 11.2 g. of 70 wt. percent solution of beta-phenylethylsiloxane (0.05 mole) in chloroform at 50–55° C. over a 15-min. period. The temperature was controlled by means of an ice bath. After addition, the mixture was maintained at 45–55° C. for 5 hrs. by means of a warm water bath, then diluted with 50 g. of crushed ice to form an aqueous solution. Chloroform was removed by steam distillation. An aliquot of the aqueous residue was titrated with standard base to determine the amount of calcium oxide required to neutralize the sulfuric acid impurities. Calcium oxide (6.7 g., 0.119 mole) in 10 ml. of water was added to neutralize the sulfuric acid impurity and the aqueous solution was then filtered to remove the calcium sulfate, the filtrate was stripped to dryness and further dried for 7 hrs. at 90° C. to yield 11.0 g. (93 mole percent) of beta-(sulfophenyl)ethylpolysiloxane containing calcium sulfate as an impurity.

EXAMPLE IV

A 500-ml., 3-necked flask was equipped with a mechanical stirrer, dropping funnel, and Dry Ice-acetone condenser. A drying tube containing anhydrous calcium sulfate was attached to the condenser vent. Liquid sulfur dioxide (200 ml.) was collected by bleeding the gas from a cylinder through a glass trap immersed in a Dry Ice-acetone bath. The liquid sulfur dioxide was placed in the reaction flask with 20.5 g. (0.25 mole) of liquid sulfur trioxide (commercial "Sulfan B") and 60 g. (0.25 mole) of beta-phenylethyl-trichlorosilane was added through a dropping funnel over a 30 min. period. The reaction mixture was allowed to reflux at −8° C. for 4 hrs., after which the condenser was removed and the sulfur dioxide evaporated. Warming at 30° C. for 15 min. removed any unreacted sulfur trioxide and gave the reaction product as the residue. Upon hydrolysis of the reaction product with 100 g. of crushed ice, followed by stripping to dryness for 20 hrs. at 100° C., solid beta(sulfophenyl)ethylpolysiloxane $$(HO_3S\text{—}C_6H_4\text{—}CH_2CH_2SiO_{3/2})$$

free of sulfate and chloride, was obtained in 81 mole percent yield.

EXAMPLE V

A 100-ml., 3-necked flask equipped with a mechanical stirrer, dropping funnel, reflux condenser, and thermometer was charged with a solution of 24 g. (0.155 mole) of beta-phenylethylsiloxane in 250 ml. of dry carbon tetrachloride. A mixture of 19.2 g. (0.24 mole) of liquid sulfur trioxide ("Sulfan B") in 100 ml. of dry carbon tetrachloride was added to the solution at 2–6° C. over a period of 1.5 hrs. After the addition the reaction mixture was refluxed for 1 hr. at 76° C. to remove excess sulfur trioxide, and the solid product removed by filtration. The solid product was dissolved in water and a slurry of barium hydroxide was added until a precipitate of barium sulfate no longer formed. The water solution was then filtered and the filtrate passed through a bed of cation exchange resin (Rohm and Haas Amberlite IR–120, hydrogen form) to remove any excess barium. The effluent was evaporated to dryness and the resulting solid beta (sulfophenyl)ethylpolysiloxane $$(HO_3S\text{—}C_6H_4CH_2CH_2SiO_{3/2})$$

was dried at 100° C.

EXAMPLE VI

In a 5-liter, 3-necked flask equipped with a mechanical stirred, dropping funnel, and thermometer, was placed technical-grade chlorosulfonic acid (466 g., 4.0 moles). Two moles (480.0 g.) of beta-phenylethyl-trichlorosilane was added through the dropping funnel to the chlorosulfonic acid over a 2.0 hr. period. Hydrogen chloride was evolved continuously. The temperature during addition was controlled at 40–50° C. by means of an ice bath. The reaction mixture was stirred for an additional hour, and was then hydrolyzed to the intermediate solid beta-(chlorosulfonylphenyl)ethylsiloxane by pouring onto crushed ice with stirring. The solid beta(chlorosulfonylphenyl)ethylsiloxane was removed by filtration, washed essentially free of sulfuric and hydrochloric acids with ice-cold water, and hydrolyzed in 5 liters of distilled water at 85° C. to give a water solution of beta-(sulfophenyl)-ethylpolysiloxane. Barium hydroxide was added as a water slurry to the water solution of beta(sulfophenyl)-ethylpolysiloxane until no more barium sulfate was precipitated. The water solution was then filtered and the filtrate was passed through a column packed with Rohm and Haas' Amberlite IR–120(H) cation exchange resin to remove residual barium ion. The clear effluent was stripped to dryness and dried for 15 hrs. at 75° C. at reduced pressure to give the solid beta(sulfophenyl)ethylpolysiloxane ($HO_3S—C_6H_4CH_2CH_2SiO_{3/2}$).

Calculated for $C_8H_9O_{4.5}SiS$: Si, 11.9%; S, 13.5%. Found: Si, 11.5%; S, 14.1%.

EXAMPLE VII

In a 250 ml., 3-necked flask equipped with a mechanical stirrer, dropping funnel, and thermometer was placed 50 g. (0.5 mole) of fuming sulfuric acid (30% $SO_3$). To the fuming sulfuric acid was added 21.9 (0.1 mole) of beta-phenylethylmethyldichlorosilane over a 25-min. period. The temperature was maintained at 40–45° C. by means of an ice bath. A copious evolution of hydrogen chloride gas occurred during the additon. The reaction mixture was then maintained at 40° C. by means of a water bath for 45 min. The reaction mixture was then hydrolyzed by pouring onto 50 g. of crushed ice. The resulting aqueous solution was neutralized with concentrated ammonium hydroxide to form the ammonium salt of beta(sulfophenyl)ethylmethylsiloxane. The aqueous solution of the ammonium salt of beta-(sulfophenyl)-ethylmethylpolysiloxane was then evaporated to dryness to give the solid ammonium salt. The solid ammonium salt of beta(sulfophenyl(ethylmethylpolysiloxane was extracted with 300 ml. of anhydrous methanol. The extracts were evaporated to dryness and the solids thus formed dissolved in 200 ml. of water, and the water solution passed through a cation exchange resin (Rohm and Haas' Amberlite IR–120, hydrogen form). Evaporation to dryness of the effluent yielded 20.5 g. (84 mole percent) of the solid beta(sulfophenyl)ethylmethylpolysiloxane. Elmental analysis confirmed the product to be beta (sulfophenyl)-ethylmethylpolysiloxane $$[HO_3S—C_6H_4—CH_2CH_2Si(CH_3)O]$$

Calculated for $C_9H_{12}O_4SiS$: Si, 11.5%; S, 13.1%. Found: Si, 10.1%; S, 13.5%.

Beta-(sulfophenyl)ethylmethylpolysiloxane was also produced using chlorosulfonic acid in place of fuming sulfuric acid, and also by the sulfonation of beta-(phenylethylmethylsiloxane) with liquid sulfur trioxide in carbon tetrachloride solvent.

EXAMPLE VIII

A. *Reaction of diphenyl and vinyltrichlorosilane*

In a 500-ml., 3-necked flask equipped with a magnetic stirrer, dropping funnel, thermometer, and reflux condenser was placed 31.6 g. (0.2 mole) of diphenyl. The diphenyl was melted (70° C.) and 1.0 g. (1 wt. percent) anhydrous aluminum chloride added. Vinyltrichlorosilane, 64.6 g. (0.4 mole) was added dropwise and the reaction temperature was maintained at 80–100° C. by the rate of addition. After addition, 2 g. of dry powdered sodium chloride was added. Distillation yielded 5.7 g. of 4-(beta-trichlorosilylethyl)diphenyl, B.P. 160–164° C. (0.08 mm. Hg)$d^{25}$, 1.26 g./cc.

*Analysis.*—Calc'd for $C_{14}H_{24}SiCl_3$: Hydrolyzable Cl, 33.7. Found: 33.8.

Further distillation yielded 11.2 g. of 4,4'-bis(beta-trichlorosilylethyl)diphenyl, B.P. 185° C. (0.08 mm. Hg) 205° C. (0.15 mm. Hg); $d^{25}$, 1.33 g./cc.

*Analysis.*—Calc'd for $C_{18}H_{15}Si_2Cl_6$: Hydrolyzable Cl, 44.4 Found: 44.2.

B. *Reaction of 4,4' bis(beta-trichlorosilylethyl)diphenyl and fuming sulfuric acid*

In a 50-ml. flask equipped with a magnetic stirrer and thermometer was placed 10 g. (0.1 mole) of fuming sulfuric acid (30% $SO_3$). 4,4' bis-(beta-trichlorosilylethyl)diphenyl (1.4 g., 0.0025 mole) was added dropwise to the fuming sulfuric acid and the temperature rose to 50° C. After the addition was completed, excess crushed ice was added cautiously to give a solid precipitate. The solid precipitate was washed free of sulfate and chloride impurities with ice water. The solid precipitate was then slowly dissolved in water over a period of 3–4 hr. to give an aqueous solution of beta- [para(4'-beta - silyloxyethylsulfophenyl) - sulfophenyl]ethylpolysiloxane, having the unit formula:

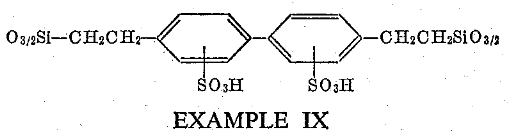

EXAMPLE IX

A dry 125-ml. flask was charged with 20 g. (0.2 mole) of fuming sulfuric acid (30% $SO_3$) and 9.76 g. (0.024 mole) of 1,4-bis(betatrichlorosilylethyl)benzene was added dropwise over a 10-min. period. The addition temperature was maintained at 50–60° C. The addition of crushed ice gave a solid gel-like solid which was washed free of water soluble impurities. The gel-like solid was dried for 18 hr. at 80° C. under reduced pressure to give 8.7 g. of beta[p-(beta-siloxyethyl)sulfophenyl]ethylpolysiloxane having the formula:

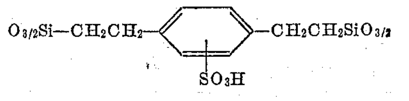

Calculated neut. equiv. 316 (found 323).

EXAMPLE X

*Reaction of naphthylene and vinylmethyldichlorosilane*

In a 250 ml. flask were placed 25.6 g. (0.2 mole) of naphthylene and 28.4 g. (0.2 mole) of vinylmethyldichlorosilane. To this mixture was added in one portion 0.9 g. of anhydrous aluminum chloride. The flask was shaken and allowed to stand at room temperature for 2 hr. During this period the mixture turned brown in color. The mixture was filtered by the use of suction and the filtrate distilled. The unreacted vinylmethyldichlorosilane was collected in a Dry Ice trap and amounted to 13.3 g. The unreacted naphthalene sublimed at 80–90° C. (0.6 mm.). Beta-naphthylethylmethyldichlorosilane (17.7 g.) which had a B.P. of 119–122.5° C. at 0.25 mm. Hg was recovered.

*Reaction of beta-naphthylethyl methyldichlorosilane and fuming sulfuric acid*

In a 200-ml. flask fitted with a condenser, thermometer, dropping funnel and magnetic stirrer, was placed 29.4 g. (0.3 mole) of fuming sulfuric acid. After cooling the fuming sulfuric acid to 10° C. by means of an ice bath, 26.9 g. (0.1 mole) of beta-naphthylethylmethyldichlorosilane was added dropwise with stirring so that the temperature remained below 20°. After the addition had been completed, the mixture was stirred for an additional hour until a taffy-like consistency was reached. Water (50 ml.) was added to the mixture in one portion to hydrolyze the chlorosilane and form a water solution. Concentrated ammonium hydroxide was added to the water solution until the solution was slightly basic. After a half-hour period of stirring, the basic water solution was filtered and evaporated to dryness under reduced pressure to give a solid. Methanol was added to the solid and the resultant mixture filtered. The filtrate was evaporated to dryness under reduced pressure to give a residue. Methanol was again added to the residue and the filtration and evaporation was again repeated. The resulting residue was then dissolved in 200 ml. of water and passed through a bed of Amberlite IR–120 (H) resin. The effluent was evaporated to dryness under reduced pressure and the residue dried at 65° C. in a vacuum overnight to yield a solid polymer weighing 9.2 g. The solid polymer was identified as beta-(sulfonaphthyl)-ethylmethylsiloxane $$[HO_3S—C_{10}H_6—CH_2CH_2Si(CH_3)O]$$

Elemental analysis confirms the solid polymers to be beta-(sulfonaphthyl)ethylmethylsiloxane.

EXAMPLE XI

In a 500 cc., three-necked flask equipped with a reflux condenser, magnetic stirrer, dropping funnel, and thermometer, there was placed 39.2 g. (0.4 mole) of fuming sulfuric acid (20–30 percent $SO_3$). To the fuming sulfuric acid there was added dropwise, with stirring, 46.8 g. (0.2 mole) of beta-phenylethyltrichlorosilane over a period of 3 hr. Reaction occurred immediately with the evolution of heat. The reaction mixture was maintained at 45–50° C. during the addition of the chlorosilane. At this point 60 ml. of chloroform was added and the mixture was poured into 100 ml. of cold water forming two layers, an aqueous layer and a chloroform layer. The aqueous layer was separated and treated with calcium carbonate to react with the sulfuric acid so that the sulfuric acid could be removed by filtration as insoluble calcium sulfate. The water was then evaporated from the filtrate and there was obtained 67 g. of a water soluble solid consisting of residual calcium sulfate, calcium chloride, and the desired calcium salt of beta(sulfophenyl)ethylpolysiloxane, $$Ca[O_3S—C_6H_4—CH_2CH_2SiO_{3/2}]_2$$

A 42-g. sample of the above water soluble solid was washed with anhydrous ethyl alcohol to remove the calcium chloride. An alcohol insoluble material (26.6 g.) remained. The alcohol insoluble material was dissolved in a small amount of water and poured into 700 ml. of anhydrous ethyl alcohol to precipitate the calcium salt of beta-(sulfophenyl)ethylpolysiloxane. There was obtained 17 g. of a solid product which was identified as the calcium salt of beta-(sulfophenyl)ethylpolysiloxane and gave the following analysis:

Calculated for $C_8H_8SiO_{4.5}SC^a$: Si, 10.1%; S, 11.6%; Ca, 14.5. Found: Si, 9.6%; S, 10.4%; Ca, 16.3.

EXAMPLE XII

Analytically pure beta-(sulfophenyl)ethylpolysiloxane (34.2 g., 0.14 mole) was dissolved in 200 ml. of distilled water. To the resulting solution was added 232.8 g. of Alcoa activated alumina pellets (grade F–10, 8–14 mesh). The pellets were allowed to soak for 2 hours, to impregnate them with beta(sulfophenyl)ethylpolysiloxane. The liquid was then drained off, and the impregnated pellets were dried, under reduced pressure, at 80–90° C. for 12 hours.

A vertical glass column (1.8 cm. diameter x 60.0 cm. long) was packed with the above impregnated pellets, i.e., aluminum impregnated with beta-sulfophenylethylpolysiloxane which was to act as the catalyst. The top of the column was fitted with a distillation head connected to a cold trap immersed in a Dry Ice-actone bath. The bottom was connected to a round-bottomed flask having a gas-inlet tube. Nitrogen gas was used as a carrier and diluent for the hydrocarbon. The catalyst bed was heated to 104–105° C. by an electrical jacket and isobutylene (preheated to 75° C.) was passed through the system at 70–80 ml. per min. for 1 hour. No isobutylene was collected in the cold trap. The lower round-bottomed flask contained a mixture of high boiling polymers, the weight of the high boiling polymers corresponded to the weight of isobutylene used. The conversion of isobutylene to high boiling polymer was 100 percent.

EXAMPLE XIII

Glass microscope slides and a glass mirror were treated with a 1 percent water solution of the sodium salt of beta-sulfophenylethylpolysiloxane $[NaSO_3C_6H_4SiO_{3/2}]_x$ by dipping or wiping this solution on the glass surface. After drying the treated surface shows no fogging when breathed on or otherwise exposed to sudden contact with warm humid air.

What is claimed is:

1. As a new composition of matter an organo-functional organosilicon compound containing at least one unit of the formula:

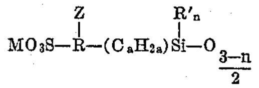

wherein Z is selected from the class consisting of hydrogen, alkyl groups, aryl groups and groups having the formula:

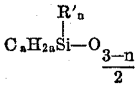

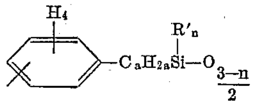

and

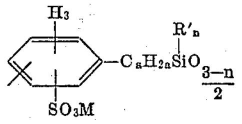

interconnected to R through carbon to carbon linkage, R is an aryl group containing up to and including 10 carbon atoms, R′ is an alkyl group, (*a*) is an integer of from 2 through 4, (*n*) is an integer of from 0 through 2, M is a member of the class consisting of hydrogen, alkali metal groups, and ammonium groups, and the aryl group represented by R is interconnected to silicon through at least 2 carbon atoms.

2. As a new composition of matter an organo-functional organosilicon compound consisting of repeating units of the formula:

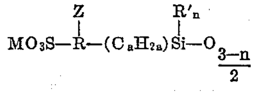

wherein Z is selected from the class consisting of hydrogen, alkyl groups, aryl groups and groups having the formula:

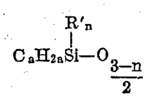

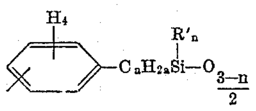

and

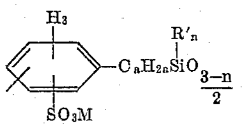

interconnected to R through carbon to carbon linkage, R is an aryl group containing up to and including 10 carbon atoms, R′ is an alkyl group, (*a*) is an integer of from 2 through 4, (*n*) is an integer of from 0 through 2, M is a member of the class consisting of hydrogen, alkali metal groups, and ammonium groups, and the aryl group represented by R is interconnected to silicon through at least 2 carbon atoms.

3. As a new composition of matter an organo-functional organosilicon compound containing at least one unit of the formula:

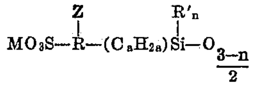

wherein, Z is selected from the class consisting of hydrogen, alkyl groups, aryl groups and groups having the formula:

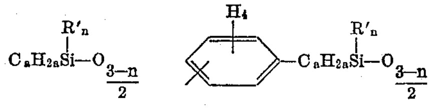

and

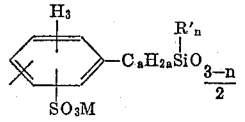

interconnected to R through carbon to carbon linkage, R is an aryl group containing up to and including 10 carbon atoms, R′ is an alkyl group, (*a*) is an integer of from 2 through 4, (*n*) is an integer of from 0 through 2, M is a member of the class consisting of hydrogen, alkali metal groups, and ammonium groups and the aryl group represented by R is interconnected to silicon by at least 2 carbon atoms, and at least one unit of the formula:

$$R''_bSi—O_{\frac{4-b}{2}}$$

is an integer of from 0 through 3.

4. As a new composition of matter an organofunctional organosilicon compound containing at least one unit of the formula:

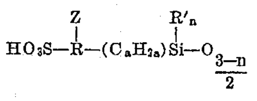

wherein Z is selected from the class consisting of hydrogen, alkyl groups, aryl groups and groups having the formula:

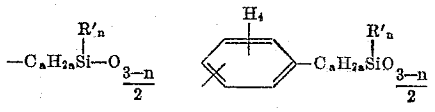

and

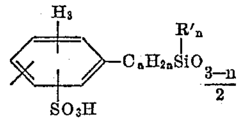

interconnected to R through carbon to carbon linkage, R is an aryl group containing up to and including 10 carbon atoms, R′ is an alkyl group, (*a*) is an integer of from 2 through 4, (*n*) is an integer of from 0 through 2, and the aryl group represented by R is interconnected to silicon through at least 2 carbon atoms.

5. The calcium salt of the composition of matter as claimed in claim 4.

6. Beta-sulfophenylethylpolysiloxane.

7. Beta-sulfophenylethylmethylpolysiloxane.

8. Beta-sulfonaphthylethylmethylpolysiloxane.

9. Beta - [para - (beta-siloxyethyl)-sulfophenyl]ethylpolysiloxane.

10. Beta-(sodiumsulfophenyl)ethylpolysiloxane.

11. A process for the production of sulfo-aralkylsiloxanes containing units of the formula:

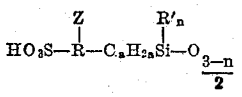

wherein Z is a member of the class consisting of hydrogen, alkyl groups, aryl groups and groups having the formula:

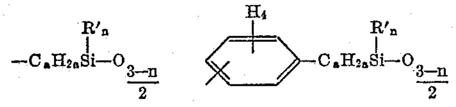

and

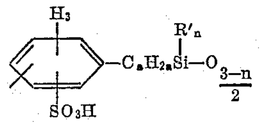

interconnected to R through carbon to carbon linkage, R is an aryl group containing up to and including 10 carbon atoms, R′ is an alkyl group, (*a*) is an integer of from 2 through 4, (*n*) is an integer of from 0 through 2, and the aryl group represented by R is interconnected to silicon by at least 2 carbon atoms, which comprises reacting an aralkylsilicon compound selected from the class consisting of aralkylhalosilanes of the formula:

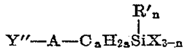

wherein Y″ is a member of the class consisting of hydrogen, alkyl groups, aryl groups and groups having the structure:

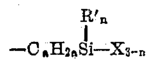

and

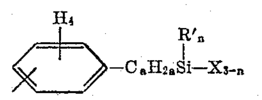

connected to A through carbon to carbon linkage, R, (*a*) and (*n*) have the above-defined meanings X is a halogen atom and A is a divalent aryl group and aralkylsiloxane of the formula:

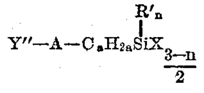

wherein A, R′, (*a*) and (*n*) have the above-defined values and Y″ is a member of the class consisting of hydrogen, alkyl group, aryl groups and groups of the formula:

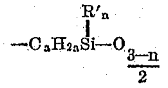

and

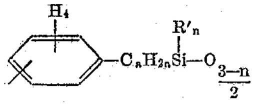

interconnected to A through carbon to carbon linkage, wherein R′, (*a*) and (*n*) have the above-defined meanings, with a sulfonating agent selected from the class consisting of sulfuric acid and sulfur trioxide and isolating said sulfoaralkylsiloxane from the reaction mixture.

12. A process for the production of sulfo-aralkylsiloxanes containing units of the formula:

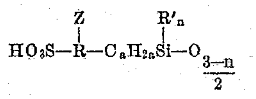

wherein Z is a member of the class consisting of hydrogen, alkyl groups, aryl groups and groups having the formula:

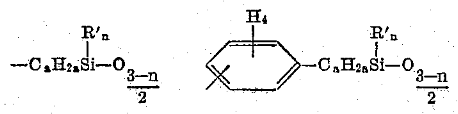

and

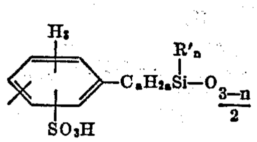

interconnected to R through carbon to carbon linkage, R is an aryl group containing up to and including 10 carbon atoms, R′ is an alkyl group, (*a*) is an integer of from 2 through 4, (*n*) is an integer of from 0 through 2, and the aryl group represented by R is interconnected to silicon through at least 2 carbon atoms, which comprises reacting an aralkylsiloxane containing units of the formula:

$$Y'''-A-C_aH_{2a}\overset{\overset{R'_n}{|}}{Si}-O_{\frac{3-n}{2}}$$

wherein Y′′′ is a member of the class consisting of hydrogen, alkyl groups, aryl groups and groups of the formula:

$$-C_aH_{2a}\overset{\overset{R'_n}{|}}{Si}-O_{\frac{3-n}{2}}$$

and

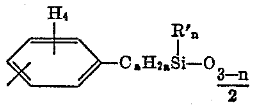

interconnected to A through carbon to carbon linkage, wherein R′, (*a*) and (*n*) have the above-defined meanings and A is a divalent aryl group containing up to and including 10 carbon atoms, with a sulfonating agent in the presence of a solvent.

13. A process for the production of sulfo-aralkylsiloxane containing units of the formula:

$$HO_3S\overset{\overset{Z}{|}}{R}-C_aH_{2a}\overset{\overset{R'_n}{|}}{Si}-O_{\frac{3-n}{2}}$$

wherein Z is a member of the class consisting of hydrogen, alkyl groups aryl groups and groups having the formula:

$$-C_aH_{2a}\overset{\overset{R'_n}{|}}{Si}-O_{\frac{3-n}{2}}$$

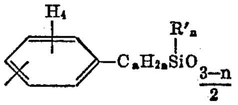

and

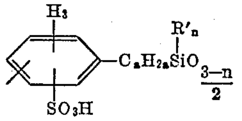

interconnected to R through carbon to carbon linkage, R is an alkyl group containing up to and including 10 carbon atoms, R′ is an alkyl group, (*a*) is an integer of from 2 through 4, (*n*) is an integer of from 0 through 2, and the aryl group represented by R is separated from silicon by at least 2 carbon atoms, which comprises reacting an aralkylhalosilane having the formula:

$$Y''-A-C_aH_{2a}\overset{\overset{R'_n}{|}}{Si}-X_{3-n}$$

wherein Y′′ is a member of the class consisting of hydrogen, alkyl groups, aryl groups and groups of the formula:

$$-C_aH_{2a}\overset{\overset{R'_n}{|}}{Si}-X_{3-n}$$

and

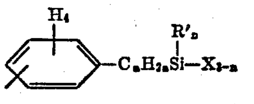

connected to A through carbon to carbon linkage, wherein R′, (*a*) and (*n*) have the above-defined meanings, X is a halogen and A is a divalent aryl group containing up to and including 10 carbon atoms, with a sulfonating agent selected from the class consisting of sulfuric acid and sulfur trioxide adding the thus resulting reaction mixture to water and isolating said sulfo-aralkylsiloxane.

14. A process for the production of sulfo-aralkylsiloxanes containing units of the formula:

$$HO_3S\overset{\overset{Z}{|}}{R}-C_aH_{2a}-\overset{\overset{R'_n}{|}}{Si}O_{\frac{3-n}{2}}$$

wherein Z is a member of the class consisting of hydrogen, alkyl groups, aryl groups and groups having the formula:

$$-C_aH_{2a}\overset{\overset{R'_n}{|}}{Si}O_{\frac{3-n}{2}}$$

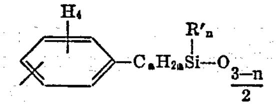

and

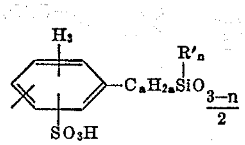

interconnected to R through carbon to carbon linkage, R is an aryl group containing up to and including 10 carbon atoms, R′ is an alkyl group, (*a*) is an integer of from 2 through 4, (*n*) is an integer of from 0 through 2, and the aryl group represented by R is interconnected to silicon through at least 2 carbon atoms, which comprises forming a mixture of water and a chlorosulfonyl-aralkylhalosilane of the formula:

$$ClO_2S\overset{\overset{Y}{|}}{R}-C_aH_{2a}\overset{\overset{R'_n}{|}}{Si}X_3$$

wherein Y is a member of the class consisting of hydrogen, alkyl groups, aryl groups and groups of the formula:

$$C_aH_{2a}\overset{\overset{R'_n}{|}}{Si}-X_{3-n}$$

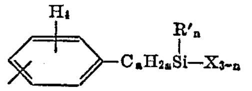

and

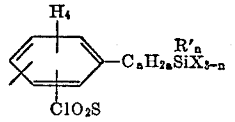

interconnected to R through carbon to carbon linkage, wherein R, R′, (*a*) and (*n*) have the above-defined meanings and X is a halogen atom and maintaining said mixture at a temperature sufficiently elevated to cause said chlorosulfonyl-aralkylhalosilane and said water to react to produce said sulfo-aralkylsiloxanes.

15. A process as claimed in claim 14 wherein the temperature is in the range of from 80° C. to 100° C.

16. A process for the production of sulfo-aralkylsiloxanes containing units of the formula:

$$HO_3S\overset{\overset{Z}{|}}{R}-C_aH_{2a}-\overset{\overset{R'_n}{|}}{Si}O_{\frac{3-n}{2}}$$

wherein Z is a member of the class consisting of hydrogen, alkyl groups, aryl groups and groups having the formula:

$$-C_aH_{2a}\overset{\overset{R'_n}{|}}{Si}-O_{\frac{3-n}{2}}$$

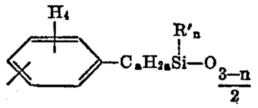

and

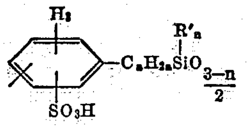

interconnected to R through carbon to carbon linkage, R is an aryl group containing up to and including 10 carbon atoms, R′ is an alkyl group, (*a*) is an integer of from 2 through 4, (*n*) is an integer of from 0 through 2, and the aryl group represented by R is interconnected to silicon through at least 2 carbon atoms, which comprises forming a mixture of water and a chlorosulfonyl-aralkylsiloxane containing units of the formula:

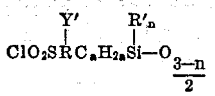

wherein Y′ is a member of the class consisting of hydrogen, alkyl groups, aryl groups and groups of the formula:

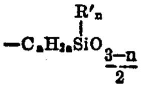

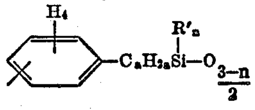

and

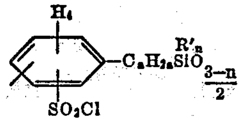

interconnected to R through carbon to carbon linkage, wherein R, R′, (*a*) and (*n*) have the above-defined meanings and maintaining said mixture at a temperature sufficiently elevated to cause said chlorosulfonyl-aralkylsiloxane and said water to react to produce said sulfoaralkylsiloxanes.

17. A process as claimed in claim 16 wherein the temperature is in the range of from 80° C. to 100° C.

References Cited in the file of this patent

Kipping: "Jour. Chem. Soc.," (London), vol. 93 (1908), pages 456–73.

Kipping et al.: ibid., 93 (1908), pages 2004–16.

UNITED STATES PATENT OFFICE

CERTIFICATION OF CORRECTION

Patent No. 2,968,643 January 17, 1961

Donald L. Bailey

It is hereby certified that error appears in the above numbered patent requiring correction and that the said Letters Patent should read as corrected below.

Column 4, line 26, strike out "$H_2O$" and insert the same beneath the arrow, same line 26; column 8, line 21, for that portion of the formula reading "$NaO_3S-C_6H_4SiO_{3/2}$" read -- $NaO_3S-C_6H_4-CH_2CH_2SiO_{3/2}$ --; column 11, line 45, for "Elmental" read -- Elemental --; column 13, line 49, for that portion of the formula reading "$C_8H_8SiO_{45}SC^a$" read -- $C_8H_8SiO_{4.5}SCa$ --; column 17, line 35, after "agent" insert -- selected from the class consisting of sulfuric acid and sulfur trioxide --.

Signed and sealed this 17th day of April 1962

(SEAL)
Attest:

ESTON G. JOHNSON
Attesting Officer

DAVID L. LADD
Commissioner of Patents